United States Patent
Yu et al.

(10) Patent No.: US 9,527,745 B2
(45) Date of Patent: Dec. 27, 2016

(54) METHOD FOR PRODUCING FEW-LAYER GRAPHENE

(71) Applicants: Aiping Yu, Waterloo (CA); Victor Chabot, Waterloo (CA); Zhongwei Chen, Waterloo (CA)

(72) Inventors: Aiping Yu, Waterloo (CA); Victor Chabot, Waterloo (CA); Zhongwei Chen, Waterloo (CA)

(*) Notice: Subject to any disclaimer, the term of this patent is extended or adjusted under 35 U.S.C. 154(b) by 0 days.

(21) Appl. No.: 14/654,215

(22) PCT Filed: Dec. 20, 2013

(86) PCT No.: PCT/CA2013/051007
§ 371 (c)(1),
(2) Date: Jun. 19, 2015

(87) PCT Pub. No.: WO2014/094180
PCT Pub. Date: Jun. 26, 2014

(65) Prior Publication Data
US 2015/0376013 A1     Dec. 31, 2015

Related U.S. Application Data

(60) Provisional application No. 61/797,980, filed on Dec. 20, 2012.

(51) Int. Cl.
*C01B 31/04*     (2006.01)

(52) U.S. Cl.
CPC ....... *C01B 31/0469* (2013.01); *C01B 2204/02* (2013.01); *C01B 2204/04* (2013.01)

(58) Field of Classification Search
CPC ............ C01B 31/0469; C01B 2204/04; C01B 2204/02; C01B 31/04; C01B 31/0407; C01B 31/0415; C01B 2204/00; C01B 2204/06; C01B 2204/065; C01B 2204/20; C01B 2204/22; C01B 2204/24; C01B 2204/28
USPC ......................................................... 423/448
See application file for complete search history.

(56) References Cited

U.S. PATENT DOCUMENTS

| 2005/0277675 A1 | 12/2005 | Fuugetsu |
| 2008/0279756 A1 | 11/2008 | Zhamu et al. |
| 2015/0376013 A1* | 12/2015 | Yu ....................... C01B 31/0469 423/448 |

OTHER PUBLICATIONS

Lotya, et al., Liquid Phase Production of Graphene by Exfoliation of Graphite in Surfactant/Water Soluitions, J. Am. Chem. Soc. 2009; 131: 3611-3620.*
Loyta, et al., High-Concentration, Surfactant-Stabilized Graphene Dispersions, ACS NANO 2010; 4(6): 3155-3162.*
PCT; International Search Report and Written Opinion dated Mar. 6, 2014 in Application No. PCT/CA2013/051007.
Ali, F. et al, "Chemical route to the formation of graphene," Current, 97, 683-685 (2009).

(Continued)

*Primary Examiner* — Daniel C McCracken
(74) *Attorney, Agent, or Firm* — Snell & Wilmer L.L.P.

(57) ABSTRACT

A method of producing single or few-layer graphene comprises exfoliating graphite with a polymer to form a graphene-polymer composite and subsequently treating the composite to disassociate graphene. The exfoliation process is conducted using sonication. The graphene is disassociated from the polymer by a treatment step such as acid hydrolysis. The method results in highly pure graphene.

18 Claims, 5 Drawing Sheets

(56) References Cited

OTHER PUBLICATIONS

Allen, M. J. et al, "Honeycomb carbon: a review of graphene," Chemical reviews, 110, 132-145 (2010).
Bandyopadhyaya, R. et al., "Stabilization of Individual Carbon Nanotubes in Aqueous Solutions," Nano 25-28 (2002).
Becerril, H. et al., "Evaluation of solution-processed reduced graphene oxide films as transparent conductors," ACS nano, 2, 463-70 (2008).
Bekyarova, E. et al., "Electronic properties of single-walled carbon nanotube networks," Journal of the American Chemical Society, 127, 5990-5995 (2005).
Bourlinos, A. B., et al., "Liquid-phase exfoliation of graphite towards solubilized graphenes," Small (Weinheim an der Bergstrasse, Germany), 5, 1841-5 (2009).
Chen, J.-H. et al., "Intrinsic and extrinsic performance limits of graphene devices on $SiO_2$," Nature nanotechnology, 3, 206-209 (2008).
Chen, C. et al., Self-Assembled Free-Standing Graphite Oxide Membrane, Advanced Materials, 21, 3007-3011 (2009).
Ci, L. et al., "Atomic layers of hybridized boron nitride and graphene domains," Nature materials, 9, 430-5 (2010).
Cozic, C. et al. "Analysis of arabic gum: Study of degradation and water desorption processes," Food Hydrocolloids, 23, 1930-1934 (2009).
Cserháti, T. et al., "Biological activity and environmental impact of anionic surfactants," Environment international, 28, 337-48 (2002).
Davies, A. et al., "Graphene-Based Flexible Supercapacitors: Pulse-Electropolymerization of Polypyrrole on Free-Standing Graphene Films," The Journal of Physical Chemistry C, 115, 17612-17620 (2011).
Deheer, W. et al., "Epitaxial graphene," Solid State Communications., 143, 92-100 (2007).
Dror, et al., "Structure of Gum Arabic in Aqueous Solution," Polymer, 5, 3265-3271 (2006).
Eda, G. et al., "Large-area ultrathin films of reduced graphene oxide as a transparent and flexible electronic material," Nature nanotechnology, 3, 270-4 (2008).
Environment Canada and Health Canada Screening Assessment for the Challenge- Hydrazine CAS RN 302-1-2. Environment Canada (2011).
Erni, P. et al., "Interfacial rheology of surface-active biopolymers: Acacia senegal gum versus hydrophobically modified starch," Biomacromolecules, 8, 3458-66 (2007).
Fan, J. et al., "Gum Arabic assisted exfoliation and fabrication of Ag-graphene-based hybrids," J. Mater. Chem., 22, 1376-13372 (2012).
Ferrari, A. C. et al., "Raman Spectrum of Graphene and Graphene Layers," Physical Review Letters, 97, 187401 (2006).
Geng, D. et al., "Nitrogen doping effects on the structure of graphene," Applied Surface Science, 257, 9193-9198 (2011).
Green, A. et al., "Solution phase production of graphene with controlled thickness via density differentiation," Nano letters, 9, 4031-4036 (2009).
Hamilton, C. E. et al., "High-yield organic dispersions of unfunctionalized graphene," Nano letters, 9, 3460-2 (2009).
Hernandez, Y. et al., "High-yield production of graphene by liquid-phase exfoliation of graphite," Nature nanotechnology, 3, 563-8 (2008).
Hummers, W. "Preparation of Graphitic Oxide," Journal of the American Chemical Society, 80, 1339 (1958).
Khan, U. et al. "High-concentration solvent exfoliation of graphene," Small (Weinheim an der Bergstrasse, Germany), 6, 864-71 (2010).
Li, D. et al., "Processable aqueous dispersions of graphene nanosheets," Nat Nano, 3, 101-105 (2008).
Lotya, M. et al., "Liquid phase production of graphene by exfoliation of graphite in surfactant/water solutions," Journal of the American Chemical Society, 131, 3611-20 (2009).
Lotya, M., "High-concentration, surfactant-stabilized graphene dispersions," ACS nano, 4, 3155-62 (2010).
Mathkar, A. et al., "Controlled, Stepwise Reduction and Band Gap Manipulation of Graphene Oxide," The Journal of Physical Chemistry Letters, 3, 986-991 (2012).
Park, S., et al., "Chemical methods for the production of graphenes," Nature nanotechnology, 4, 217-24 (2009).
Rao, et al., "Graphene: the new two-dimensional nanomaterial," Angewandte Chemie (International ed. in English), 48, 7752-77 (2009).
Seo, J. et al., "High-Concentration Aqueous Dispersions of Graphene Using Nonionic Biocompatible Block Copolymers," J. Phys. Chem. Lett., 2, 1004-1008 (2011).
Shin, H.-J. et al., "Efficient Reduction of Graphite Oxide by Sodium Borohydride and Its Effect on Electrical Conductance," Advanced Functional Materials, 19, 1987-1992 (2009).
Singh, V. et al., "Graphene based materials: Past, present and future," Progress in Materials Science, 56, 1178-1271 (2011).
Smith, R. J. et al., "Lateral size selection of surfactant-stabilised graphene flakes using size exclusion chromatography," Chemical Physics Letters 531, 169-172 (2012).
Stankovich, S. et al., "Synthesis of graphene-based nanosheets via chemical reduction of exfoliated graphite oxide," Carbon, 45, 1558-1565 (2007).
Swenson, H. A. et al., "Structure of Gum Arabic and Its Configuration in Solution Isolation of Gum Arabic," Journal of Polymer Science, 6, 1593-1606 (1968).
Tauc, J. et al., "Optical Properties and Electronic Structure of Amorphous Germanium," physical status sol. (b), 15, 627-637 (1966).
Tauc, J., "Electronic Properties of Amorphous Materials," Science, 158, 1543-1548 (1967).
Tung, V. C. et al., "High-throughput solution processing of large-scale graphene," Nature Nanotechnology 4, 25-29 (2009).
Vadukumpully, et al., "Cationic surfactant mediated exfoliation of graphite into graphene flakes." Carbon, 47, 3288-3294 (2009).
Wei, J. et al., "Preparation of highly oxidized nitrogen-doped carbon nanotubes," Nanotechnology, 23, 155601 (2012).
Yan, Z. et al., "Growth of bilayer graphene on insulating substrates," ACS nano, 5, 8187-8192 (2011).
Yu, A. et al., "Enhanced Thermal Conductivity in a Hybrid Graphite Nanoplatelet—Carbon Nanotube Filler for Epoxy Composites," Advanced Materials, 20, 4740-4744 (2008).
Yu, A. et al., "Graphite Nanoplatelet-Epoxy Composite Thermal Interface Materials," Journal of Physical Chemistry C, 111, 7565-7569 (2007).
Yu, A. et al., "Ultrathin, transparent, and flexible graphene films for supercapacitor application," Applied Physics Letters, 96, 253105 (2010).
Yu, A. et al, Graphene nanoplatelets supported $MnO_2$ nanoparticles for electrochemical supercapacitor. Synthetic Metals, 161, 2049-2054 (2011).
Zhao, B. et al., "Study of the Extinction Coefficients of Single-Walled Carbon Nanotubes and Related Carbon Materials," The Journal of Physical Chemistry B, 108, 8136-8141 (2004).
Zhao, B. et al., "Extinction Coefficients and Purity of Single-Walled Carbon Nanotubes," Journal of Nanoscience and Nanotechnology, 4, 995-1004 (2004).
Zhao, X. et al., Low-cost preparation of a conductive and catalytic graphene film from chemical reduction with $AlI_3$, Carbon, 50, 3497-3502 (2012).
Zhou, X. et al., "A scalable, solution-phase processing route to graphene oxide and graphene ultralarge sheets," Chemical communications (Cambridge, England), 46, 2611-2613 (2010).
Zoller, U. et al., "Water Reuse / Recycling and Reclamation in Semiarid Zones: The Israeli Case of Salination and "Hard" Surfactants Pollution of Aquifers 1," Journal of Environmental Engineering 683-688 (2006).

* cited by examiner

Figure 1a
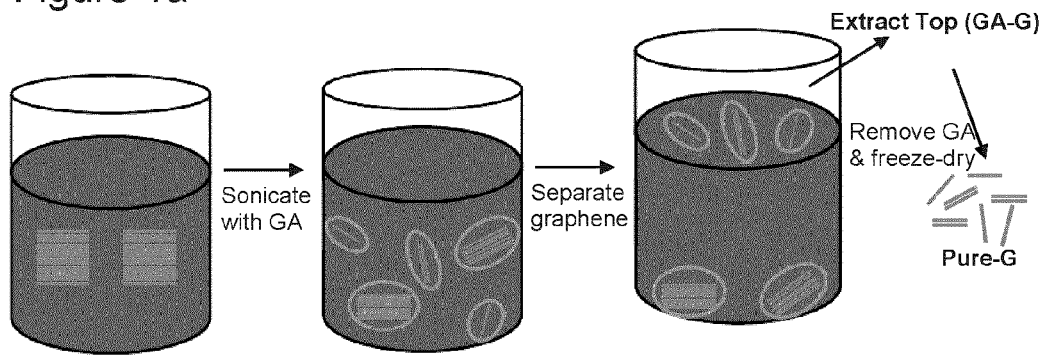
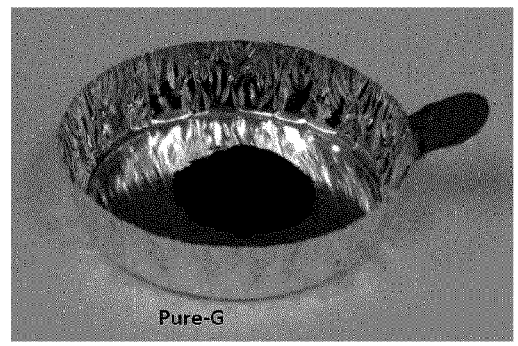
Figure 1b
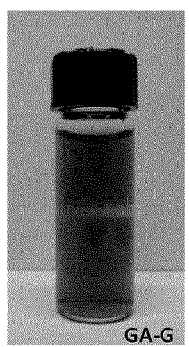
Figure 1c
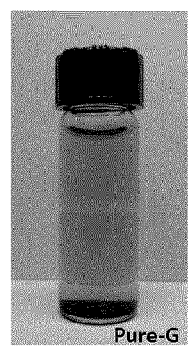
Figure 1d
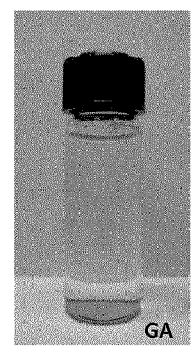
Figure 1e

METHOD FOR PRODUCING FEW-LAYER GRAPHENE

CROSS REFERENCE TO RELATED APPLICATIONS

This application is a U.S. National Phase filing under 35 U.S.C. §371 of PCT/CA2013/051007, filed on Dec. 20, 2013, which claims priority to U.S. Provisional Application No. 61/797,980, filed on Dec. 20, 2012, the entire contents of which are incorporated herein by reference.

FIELD OF THE INVENTION

The present invention relates to methods of producing graphene. In particular, the method relates to producing few-layer graphene directly from graphite.

BACKGROUND OF THE INVENTION

Single layer and few-layer (i.e. ten or fewer layers) graphenes exhibit a two dimensional carbon lattice structure with outstanding properties including high surface area as well as strong electronic, mechanical, thermal and chemical properties[1,2]. These properties have created considerable interest throughout the scientific community in recent years.

The first discovery of graphene was carried out by scotch taping peeling, although this approach can obtain pure graphene sheets, the process is not economical and impossible for mass production. The use of chemical vapour deposition (CVD) for production of few layer graphene has shown promise[1,3,4]. However, CVD produced graphene exhibits a low purity mixture of amorphous carbon. Many applications of graphene require large scale, high yield processes applicable to macroscale deployment. Currently, the most prominent technique for the scalable production of few-layer graphene is the chemical reduction or thermal treatment of graphene oxide (GO) from Hummer's method[5-11]. However, the oxidization process also exposes a large number of structural defects within the graphene sheets that compromise some of the properties and the unique morphology of the pristine two dimensional hexagonal carbon lattices[11-14]. Further, the multistep process, the concentrated acids used in oxidization and the high heat or harsh chemicals needed to reduce GO increase the economic, safety and environmental costs involved in large scale production[15].

The drawbacks of the GO process have encouraged the pursuit of easily scalable processes to produce graphene with low basal plane and edge defects. For example, it has been shown that sonication of graphite with a solvent or surfactant can produce graphene flakes with low defect concentration. However, challenges associated with this method include low yield and purification difficulties. Exfoliation methods using organic solvents containing aromatic donors such as ortho-dichlorobenzene, n-methylpyrrolidone and benzylamine have shown stable dispersions up to 1 mg/mL through extended low power bath sonication, but are expensive and require special handling[16-19.] Surfactant based methods have also been investigated for large scale production, but are currently limited by low concentrations, of up to 0.05 mg/mL[20,21]. Longer sonication periods (400 hours) were shown to increase exfoliation concentration up to 0.3 mg/ml[22] using sodium cholate. However, some surfactants exhibit bioaccumulation and are capable of adsorbing to proteins, disrupting enzyme function and causing organ damage[23]. The adverse cytotoxic health effects are coupled with potential environmental issues. Further, the large-scale application of surfactants creates significant accumulation in the water table, leading to the need for purification and treatment procedures to limit mammalian exposure[23-25]. These waste water treatments can add cost to the exfoliation process, reducing value.

More recently, Fan et al. have suggested the use of Gum Arabic for the exfoliation of graphene from graphite (J. Fan et al., *J. Mater. Chem.*, 2012, 22, 13764-13772). The entire contents of this reference are incorporated herein by reference. However, the method disclosed in this reference results in a Gum Arabic/graphene complex, which is then treated to form a further complex with Ag. This reference does not teach a method for obtaining pure graphene.

Thus, the known graphene production methods involve various drawbacks. For example, the known methods often result in graphene of low purity, in that the resulting graphene contains a high amount of dispersant residues. The known methods are also often difficult to scale up and/or involve complex steps or equipment. In addition, the known methods are often not "environmentally friendly" in that they involve reactants or conditions that are hazardous or that may result in environmental damage.

There exists a need to alleviate at least one of the known drawbacks associated with known graphene production methods.

SUMMARY OF THE INVENTION

In one aspect, the present invention provides a method for producing graphene, the method comprising:
 a) contacting graphite with a polymer solution to exfoliate graphene from the graphite by forming a graphene-polymer composite;
 b) separating graphite from the solution containing the graphene-polymer composite;
 c) treating the solution containing the graphene-polymer composite to disassociate graphene from the polymer; and,
 d) isolating graphene from the solution.

The treatment in step (c) is preferably conducted using an acid hydrolysis to hydrolyze the polymer.

BRIEF DESCRIPTION OF THE DRAWINGS

The features of the invention will become more apparent in the following detailed description in which reference is made to the appended drawings wherein:

FIG. 1a schematically illustrates a method according to an aspect of the invention for obtaining a few-layer graphene.

FIG. 1b illustrates the obtained pure graphene powder, extracted from 1 L solution.

FIG. 1c illustrates the dispersion quality via the Tyndall effect, dilution of unclean Gum Arabic-graphene (GA-G) before removal of Gum Arabic (GA). The samples were allowed to settle for 48 hours before imaging.

FIG. 1d illustrates the re-dispersion of pure-graphene (G) powder after removal of GA with the same concentration of 0.02 mg/ml. The majority of the graphene precipitated to the bottom of the vial.

FIG. 1e illustrates pure GA dissolved in solution.

DETAILED DESCRIPTION OF THE INVENTION

Figure 2A:
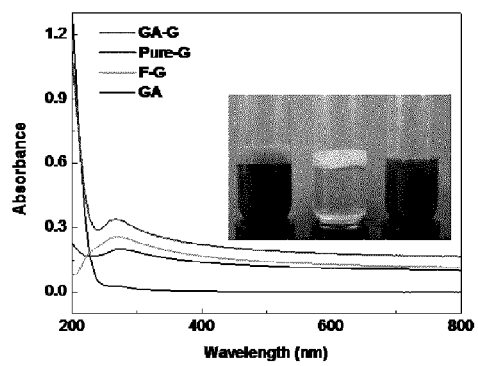
FIG. 2a illustrates a UV absorption curve comparing the absorbance vs. wavelength ($\lambda$) for different graphene (G) and Gum Arabic (GA). The Inset visually illustrates the foaming in unclean GA-G (left), separation filtrate (middle, majority is GA) and the re-dispersed GA-G supernatant.

As used herein, the term "few-layer graphene" will be understood to mean graphene having one or more layers. Generally, this term will be used to refer to graphene having up to ten layers. In one aspect, the term "few-layer" will be used to refer to graphene having up to five layers.

As used herein, the term "biopolymer" will be understood to mean a variety of naturally occurring polymers such as polysaccharides, polypeptides or a combination thereof. In a preferred embodiment, as described further below, the biopolymer used in the method of the invention comprises Gum Arabic, which comprises a polysaccharide and polypeptide complex.

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art.

The present invention pertains to a unique method of producing graphene. Generally, the graphene formed according to the present invention may be classified as being monolayer or few-layer, and would generally have a thickness of less than 5 nm. In one aspect, the graphene formed according to the method has less than ten layers and more preferably less than five layers. The graphene sheets formed according to the present method have been found to maintain a rigid edge structure and a length and width scale ranging from a few tens of nanometers to greater than 1 μm. According to one aspect of the invention, the graphene can be prepared using a method which comprises the steps of (a) exfoliation of graphite using a biopolymer, using sonication, and (b) selective removal of the biopolymer residue to result in few-layer graphene platelets of high purity. Preferably, the sonication is conducted under low power and the removal of the biopolymer residue is conducted at low temperatures.

In one aspect, the invention provides a method that results in few-layer graphene platelets having a thickness less than 5 nm, and a yield of approximately 10-15 wt % from the original graphite. The invention results in highly purified graphene, with purity generally greater than about 99.9%. The method of the invention is scalable, environmental friendly, and economical (i.e. involving minimal cost).

According to one aspect of the invention, the method involves (a) the production of a graphene dispersion using at least one environmentally safe or compatible dispersant such as a biopolymer, or a complex of proteins and polysaccharides having strong stabilizing and emulsifying properties in water. Step (a) generally involves some type of agitation, preferably sonication, in order to cause the required mixing of, and contact between the graphite and dispersant. In another aspect, the method of the invention involves (b) the separation of the dispersant, such as by using acid hydrolysis, to selectively hydrolyze the biopolymer, thereby separating the dispersant from the graphene. In a further aspect, the invention involves (c) centrifugation of the treated solution to obtain single or few-layer graphene.

In step (a) the graphite precursor may come from one or a combination of either natural or synthetic graphite. While the dispersant, or dispersing agent, of the invention is preferably a polymer or a biopolymer, such as Gum Arabic or any substitute therefor, such as guar gum, locust bean gum, carrageen gum or xanthan gum. For example, suitable dispersants may comprise Gum Arabic alternatives having similar emulsifying properties and which may be extracted or modified from food starches. The benefits of Gum Arabic in the present invention includes its low cost, established safety and low environmental risks illustrated through extensive use in food production, such as in soft drinks, etc. Further, Gum Arabic is readily available on a large scale. The sonication utilized in step (a) preferably involves a low power setting, such as a setting of about 50 W-500 W. It will be understood that a lower power setting may require a longer treatment time. The entire process of the invention can be semi-continuous by using multiple sonication baths.

The acids used in the hydrolysis involved in step (b) may comprise one acid or a combination of acids. Suitable acids for the hydrolysis include nitric acid and/or sulfuric acid, or any other acid or acid mixture which achieves the selective removal of the polymer (e.g. Gum Arabic) used in step (a). The resulting material after the hydrolysis treatment generally exhibits an improved conductivity and negligible mass loss, as identifiable in the polymer regions in TGA (thermo-gravimetric analysis) characterization.

In the methods mentioned above the invention applies to the use of an aqueous solution containing the dispersing agent to exfoliate and disperse the starting graphite material. After exfoliation the undispersed material and its anchored polymer residue are removed by any method, such as one involving a gravimetric force (i.e. centrifugation). The dispersed volume is then subjected to treatment step (b) mentioned above. Prior to treatment the volume may be reduced to enhance the strength of the acid treatment. Further, the under exfoliated graphite material can be recycled, in a new solution or in subsequent batches, thereby increasing yield and decreasing waste.

The method of the present invention for manufacturing graphene has a number of advantages. For example, the method is simple in that there are no complex multi-stage steps in the production process. Further, the process combines one step exfoliation of graphene using an aqueous solution. The use of biopolymers (e.g. Gum Arabic) for the exfoliation step is environmentally friendly. Further, the residue treatment step (i.e. the acid hydrolysis step) results in a highly pure graphene product, compared to graphene nanoplatelets prepared by other surfactant or biopolymer exfoliation methods.

The dispersion of step (a) is prepared by initially dissolving the dispersing agent (i.e. biopolymer) in water, before the addition of graphite. Following the mechanical mixing of the graphite into solution, sonication is used for time periods between 1-100 hours to slowly exfoliate the graphite flakes and the graphene sheets become stabilized in solution. As mentioned above, the sonication is preferably conducted in a low power setting, thereby requiring a longer treatment time (i.e. 60-100 hours).

The dispersing agent presents a one-step exfoliation of the graphite during the sonication step. The product is highly dispersed, allowing it to be separated from the heavier insufficiently exfoliated graphite material or thick graphene structures (i.e. not few-layer). This separation is further facilitated either by gravity settling, when the sample is left undisturbed, or enhanced by small centrifugal forces at speeds of 1000 rpm or less. The highly dispersed graphene emulsion that remains is stable even at high speed centrifugation as high as 10000 rpm and is resistant to filtration. Varying pH as well as salt concentration reveals that selective precipitation of the graphene particles is difficult. The polymer residue binds the graphene material in all cases, only allowing it to easily separate if the dissolved polymer is precipitated as well.

In one embodiment, the separation step is conducted by partially selective destabilization of the graphene materials. For example, in one embodiment, acetone may be added to generate a phase mixture, thereby selectively trapping a portion of the biopolymer in the dispersed phase while graphene with significant polymer residue flocculates out of solution for collection.

The well dispersed graphene material cannot be separated from the dispersant residue by conventional methods such as centrifugation, foaming or filtration. In practice it would be possible to remove the bulk dispersant material with elevated temperature. The presence of stable carbonaceous material delays the release of tightly bound residue until subjected to higher temperatures, which results in the material to degradation and aggregation. TGA analysis reveals that in the case of Gum Arabic the biopolymer is stable until over 230° C. and residue remains until temperatures above 500° C., at which point the graphene material become combustible as well. The acid treatment method presented in this invention provides a way to remove all of the polysaccharide/polymer dispersant without the need for high temperatures to burn away the bulk.

In a preferred method the dispersed graphene emulsion is only reduced in volume via some combination of rotary evaporation, elevated temperature up to 60° C. or convective cooling. The solution may then be subjected to an embodiment of step (b), where the acid treatment allows selective removal of the dispersant but the stable structure of the graphene remains intact and undamaged. The acid hydrolysis temperature is preferably between 100-180° C., which is much lower than the ignition point of the polymers. Further, the low temperature remains below the burn temperature of the graphene material. Following treatment the remaining graphene solids are washed and filtered to remove both the acid and any dissolved reaction products remaining in the vessel.

Thus, in one aspect, the invention comprises a method for producing few-layer graphene, such as graphene having an average thickness of less than ten layers, preferably less than five layers, from a graphite precursor, wherein the method comprises the following steps:

forming a solution of a solvent, a dispersant and graphite material in a reaction vessel, wherein the dispersant is preferably a polymer, and more preferably, a biopolymer;

mixing the reactants together, such as with sonication, to cause exfoliation of the graphite into thin graphene flakes or platelets;

separating the dispersed graphene flakes or platelets from the under-exfoliated graphite flakes, wherein the graphene flakes are complexed with the dispersant;

subjecting the dispersant-graphene complex to treatment step, such as an acid hydrolysis step, to selectively remove the dispersant;

separating the pure single- or few-layer graphene using a separation method, such as centrifugation.

As will be understood, the method of the invention can be used to produce graphene, which in turn can be used in any variety of applications such as: electrical/thermal/mechanical reinforcement in polymer composites; EMI and RFI shielding; electrochemical energy storage, such as in supercapacitors, lithium ion batteries or a hybrid of these two technologies. In addition, with the present method, stainless steel coated with graphene can be used in automotive applications in place of gold.

In one aspect, the sonication is conducted under low power for a time period of about 1-100 hours. As will be understood, the sonication time can be reduced by applying a higher sonication power. The required time period for this process will be apparent to persons skilled in the art having regard to the present description and the examples contained herein. The sonication step may be conducted under temperatures of about 10° to 50° C. As will be understood, with higher temperatures, a greater dispersion of the reactants can be achieved. However, for example to address economic considerations, the power level of the sonication step is may be kept low and the temperature may be retained at room temperature.

In one aspect, the weight percent of the dispersant dissolved in the solvent solution is about 0.1 to 15 wt %, before the addition of graphite.

In one aspect, the concentration of graphite added to the solvent is about 1 to 10 mg/mL.

In one aspect, the dispersant is an environmentally friendly biopolymer, such as Gum Arabic taken from either or a combination of the two tree species *Acacia Senegal* or *Acacia Seyal*. However, other biopolymers may equally be used as an alternative to Gum Arabic, where such biopolymers are extracted from different sources, but still have the aforementioned stabilization and emulsifying properties. In another aspect, the dispersant polymer is a synthetic alternative to Gum Arabic, and is composed of a combination of protein and sugar chains designed to mimic the properties of Gum Arabic.

In one aspect of the invention, the separation of the dispersant from the exfoliated graphene is performed using an acid reflux or acid hydrolysis step. The acid used for such step may, for example, be nitric acid, sulphuric acid or a combination thereof. Various other acids may be used to separate the biopolymer from the graphene and such acids would be known to persons skilled in the art. Similarly other alternate processes or methods for separating the biopolymer from the dispersant may be used.

In one aspect, where an acid hydrolysis step is used, the acid may be provided in volume ratio of about 1:1 to 10:1 of concentrated acid to dispersed graphene solution.

The acid reflux or hydrolysis reaction is preferably performed using a variable temperature ramp, followed by reflux time between 1-24 hours. The acid reflux reaction is preferably performed at temperatures of about 50° C. to 200° C.

In one aspect, prior to the acid hydrolysis treatment, a precipitation step may be performed to reduce the water concentration of the solution prior to acid treatment.

In one aspect, following the acid treatment step, the solution may be dried, such as using freeze drying.

The invention will now be described with reference to specific examples. It will be understood that the following examples are intended to illustrate the invention and are not to be construed as limiting the scope of the invention in any way.

Example 1

Formation of GA-Graphene from Graphite with Treatment

Ten grams of graphite flakes were added to a 1 L distilled water containing 10 wt % of dissolved Gum Arabic ("GA"). The solution was gently sonicated in a low power sonication bath for 60 hours, regulating temperature at approximately 30° C. After the exfoliation step the solution was allowed to settle for 48 hours. At which time the dispersed liquid phase was transferred to another reaction vessel for the purification. After adding 150 mL of nitric acid, stirring well, the acidic solution was slowly heated to 160° C. to selectively remove the Gum Arabic, leaving only the exfoliated graphene platelets. After filtration and washing to remove the extra acid, Acidic and GA residue in the vapour outlet was neutralized by trapping with a basic solution before venting. The under-exfoliated graphite phase, with remaining Gum Arabic, was re-dispersed in 1 L of distilled water and sonicated again to bring total yield to 500 mg. Powder was collected after freeze drying and platelets were determined to have an average thickness of 5 layers or approximately 2 nm.

Example 2

Formation/Testing of Conductive Pellet

Approximately 50 mg of powdered graphene platelets produced in Example 1 was evenly dispersed within a 1 inch stainless steel mold. After assembly, the mold was subjected to a 4000 psi cold press technique for 1 minute in order to compress the powder into pellet form. The thin rectangular pellet (190 um thick) was tested by 4 point probe method to be ~200 S/cm, comparable to graphite and SWNT based pellets.

Example 3

Half Cell Testing as Supercapacitor Electrode Material 2 mg of powdered graphene platelets produced in Example 1 were suspended in 4 mL distilled water. 20 μL of the 0.5 mg/mL solution was deposited on a glassy carbon electrode before the addition of a low concentration Nafion® sealant. The electrode was tested using 2 mol/L sulfuric acid as the electrolyte, in a standard three electrode setup for those skilled in the art. Cyclic voltammetry results show the capacitance of the materials ranging from 35-150 F/g depending on different scan rate.

Example 4

Li Ion Battery Half-Cell Testing

Powdered graphene platelets produced in Example 1 were mixed with approximately 10 wt. % PVDF binder before the addition of N-Methyl-2-pyrrolidone (NMP) as solvent to form slurry. The slurry was transferred onto copper foil and a thin film was made using a doctor blade technique. After thoroughly drying, the foil was pressed and punched to form electrodes, then placed in vacuum oven overnight at 100° C. The electrodes were then transferred to a controlled argon environment and assembled into coin cells using Li-metal anode and separator film. Testing was performed by constant current charge and discharge.

Example 5

Polymer Composite Processing

Graphene was dispersed in acetone by high shear mixing for 30 minutes followed by bath sonication for 24 h. The composites were prepared as follows: epoxy resin was dispersed by high-shear mixing with prepared the graphene suspension. The solvent was removed at 50° C. in a vacuum oven and the curing agent was added under continuous stirring. The mixture of epoxy with the homogeneously dispersed graphene was loaded into a custom stainless steel mold, degassed and heated in vacuum for curing. The composites were cured at 100° C. for 2 h and at 150° C. for additional 2 h to complete the curing cycle. This process was found to be efficient and identical to produce well-dispersed few-layer graphene in polymer composite and the dispersion results were verified by TEM.

Example 6

Production and Isolation of Few-Layer Graphene

In this work, we demonstrate Gum Arabic as an efficient alternative and environmental friendly material for the simple liquid phase exfoliation of graphite to produce graphene in water. Gum Arabic (GA) is a slightly acidic biopolymer which offers strong emulsification properties, high solubility in water, low viscosity and solution stability over a large pH range[26,27]. GA has been used to debundle SWNT in solution, forming stable ink dispersions of individual SWNTs and illustrating its ability to disperse carbon particles[28]. The major component of the structure is composed of a highly branched polysaccharide ($MW_n$=250 kDa)[29]. Hydrodynamic radius of the polymer is only 10 nm confirming the highly branched structure and the compact protein folding of the chain[26]. The compact arrangement of GA explains the low viscosity in water. Further, the glycoprotein portion is surface active, viscoelastic at the interface, and physically adsorbs through steric repulsion, contributing to the materials strong emulsifying property[29,30]. Benefits of Gum Arabic include its low cost, established safety and low environmental risks illustrated through extensive use in food production, such as Coca-Cola. Further, Gum Arabic is readily available on a large scale.

Utilizing the high solubility and strong adsorption properties of GA, we have achieved 0.5-0.6 mg/ml highly dispersed of a few layer graphene in DI-$H_2O$ through controlled mild sonication (GA-G). After removal of the GA, the resulted graphene is almost defect free, having much higher electrical conductivity compared to that from reduced GO, and up to 5 wt. % yield based on the starting graphite. Thus, this approach is scalable, having minimum cost capital investment on the chemicals and equipment, and supplying affordable graphene products to the market. Further, this process provides an inexpensive means of providing graphene in a mass production manner.

Methods and Materials

Production of Graphene with Gum Arabic.

Natural graphite powder was purchased from Alfa Aesar (thickness 5-15 µm) and used without further treatment. Gum Arabic was purchased from Sigma Aldrich. The purified single-walled carbon nanotubes used for electrical conductivity comparison reason were purchased from Carbon Solutions, Inc. GA powder was dissolved in 1 L of DI water to create a solution from 0.5-5 wt. %. Then, 10 g of graphite was added to form our graphite solution. The graphene dispersion was generated using extended low power ultrasonication bath (Branson 5510) for around 100 hours. To prevent overheating and maintain efficiency the water in the sonication bath was changed to maintain the temperature lower than 40° C. and degassed frequently. Upon completion the dispersion was left to sit overnight to enable separation of large unstable graphite aggregates. The sample was further isolated by a low speed centrifugation of 500 rpm for 30 min. The supernatant, denoted as GA-G, containing only well dispersed graphene particles was kept for testing and for further treatment.

Separation of Graphene from Gum Arabic.

To remove the GA left in the graphene, high speed centrifuge or filtration can be applied to get rid of the majority of the GA. To further totally remove GA, acid treatment had also been used. The final product was moved to a freeze dryer and the resulting black graphene powder gave a mass yield of up to 0.5 g, or 5 wt. % of the original 10 g graphite used. The purified product contains a few layer graphene which was denoted as Pure-G.

Regular Graphene Production.

For comparison we prepared a chemically reduced graphene using the sae graphite precursor oxidized through Hummers method[49] and our previous reported procedure[50-52]. To reduce the graphene oxide (GO), a solution of 400 mg GO and 40 mL DDI water was sonicated and then sodium carbonate was added until pH reached 10. Next, 3 g of sodium borohydride (98% min., EMD chemicals) was dissolved in 50 mL of DDI water before it was added to the reaction vessel and allowed to react at 80° C. for 48 hours. The resulting graphene powder was filtered and washed with DI water and ethanol before being dried. The resulted product from regular procedure was denoted as F-G since it still contains significant amount of chemical functionalities such as —COOH and —OH groups.

Characterization.

Optical absorption measurements were taken with Genesys 10 UV spectroscopy. Absorption measurements were used to estimate residual GA levels. TGA was performed to estimate graphitic content using a slow temperature ramp of 5° C.·min$^{-1}$ up to a temperature of 800° C. Scanning electron microscopy (SEM) characterization of material morphology was prepared by loading a few mg of freeze dried sample onto carbon tape. Transmission electron microscopy (TEM) was prepared by re-dispersing a small quantity of dry sample and dropping a few milliliters onto a carbon grid. RAMAN characterization was used to analyze edge defects and estimate layer thickness. Electrical conductivity was determined by pressing the graphene and SWNT powder materials at 4000 psi to form small pellets that approach the maximum density of the material and a 4-probe electrochemical test setup with 5 mm spacing was used for measurement.

Results

After the material synthesis of Pure-G, summarized in FIG. 1(a), the resulting black graphene powder was found to be 5 wt % of the starting graphite mass. It was noted that the graphene powder seen in FIG. 1(b) differs significantly from the shiny metallic grey of graphite. FIG. 1(c) illustrates the quality of dispersion of GA-G with concentration of 0.02 mg/ml over time using the Tyndall effect, the stable sample being diluted 20 times from the bulk GA-G dispersion in order to make the laser visible. The clear seen path of the laser and lack of precipitate on solution bottom depicts a stable colloid dispersion after 48 hours. Meanwhile, the precipitation in FIG. 1(d) depicts the hydrophobic nature of pure graphene, difficult to re-disperse and becoming saturated at very low concentrations. The control sample in FIG. 1(e) contains dissolved GA at a high concentration of 20 mg/mL and Tyndall effect is barely seen, indicating its presence does not greatly affect the scattering of graphene in FIGS. 1(c) and 1(d).

FIG. 2(a) compares the UV absorption of the supernatant GA-G, GA-G after centrifuge, and GA, as well as the F-G resulted from regular graphene oxide. For all the solution containing graphene, there is a peak centered at 268 nm. Obviously, this characteristic peak resulted from graphene since GA itself reveals minimal absorbance at this location. The inset pictures visually illustrate the foaming in unclean GA-G (left) and pure GA (middle) after vigorous shaking. The sample GA-G after centrifuge (right) did not show any visual foaming, proving that the majority GA has been removed from the centrifuge.

Figure 2B:
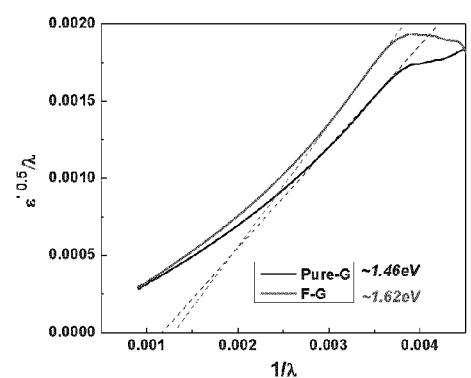
FIG. 2b illustrates the band-gap curve of pure-G and F-G resulted from Tauc's equation.

FIG. 2(b) demonstrates the calculation of band-gap of different graphene materials based on the UV-spectra. To calculate the optical bandgap, $E_g$, Tauc's equation was used[31]:

$$\omega^2 \in' = (\hbar\omega - E_g)^2, \quad [\text{eq. 1}]$$

where $\in'$ is the complex part of the dielectric function.

However it is proportional to the absorbance according to Tauc[32] and it is commonly taken as the optical absorbance. $\omega = 2\pi/\lambda$, is the angular frequency of the incident radiation. According to the technique, the plot of $\in'^{0.5}/\lambda$ versus $1/\lambda$ is a straight line and the intersection point with the x-axis is $1/\lambda g$ ($\lambda g$ is the gap wavelength)[33-35]. The optical band gap is then calculated based on $Eg=hc/\lambda g$. The bandgap curve is shown in FIG. 2(b) and from the intercept we can determine that the bandgaps are 1.46 eV and 1.62 eV, for Pure-G and F-G respectively. The slightly lower bandgap might suggest high retention of the metal like conductivity seen for graphite due to the abundance of delocalized $sp^2$ hybridized carbons. Meanwhile, the reduction of insulating GO to F-G attempts to restore the integrity and conductivity of the graphene basal plane. Based on the band-gap data, we can predict that the conductivity of Pure-G will be significantly higher than that of F-G.

Figure 2C:
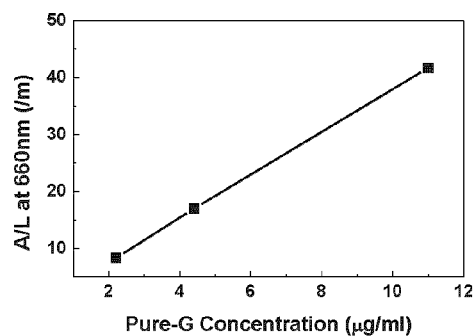
FIGS. 2c and 2d illustrate UV absorption curve results from a serial dilution illustrate the ratio of 660 nm absorbance over path length (A/L) vs. graphene concentration for pure-G concentration in the GA-G solution (c) and samples containing a known concentration of F-G (d).
Figure 2D:
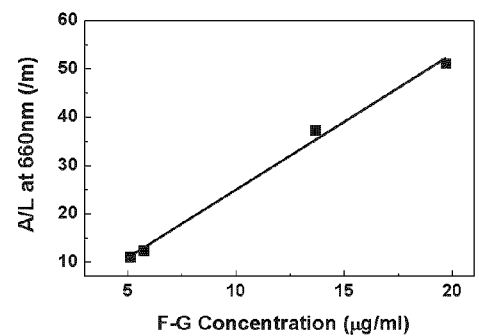

To further quantify the character of the exfoliated graphene material we perform analysis UV analysis on a series dilution of the collected GA-G solution. Since the GA has no absorption at 660 nm, it is assumed that all the absorption of GA-G resulted from graphene only. Utilizing the TGA analysis seen in FIG. 3 the concentration of GA-G is converted to units of concentration for Pure-G and shown as FIG. 2(c). FIG. 2(d) illustrates serial dilution of F-G at similar concentration for comparison. The data points in FIGS. 2(c), (d) are fitted by linear regression with a zero intercept. The extinction coefficients shown in Table 1 are then determined using beers law:

$$A/L = \in C \quad [eq. 2]$$

Where transmission length (L) is constant and extinction coefficient (∈) is constant for a specific material and wavelength.

TABLE 1

Summary our extinction coefficient data at 660 nm compared with other surfactant exfoliated graphene materials.

| Material | Extinction Coefficient (ml/mg · m) | Additional Sources |
|---|---|---|
| Pure-G | 5422 | |
| F-G | 2813 | |
| G from sonication in solvent | 6600 | 22 |

As can be seen from the table 1, the extinction coefficient for Pure-G is calculated to be 5422 ml/mg·m. This is much higher than that for our chemically reduced GO which exhibits a value of 2813 ml/mg·m (FIG. 2(d)). Our value is more similar to the 6600 ml/mg·m seen by Lotya et al for higher concentration dispersions achieved by long sonication time in NMP[22]. The extinction coefficient is assumed to be a characteristic material property, while the distinction of the value probably means that the graphene produced from different methods have different layer and surface properties[36,37].

Figure 3A:
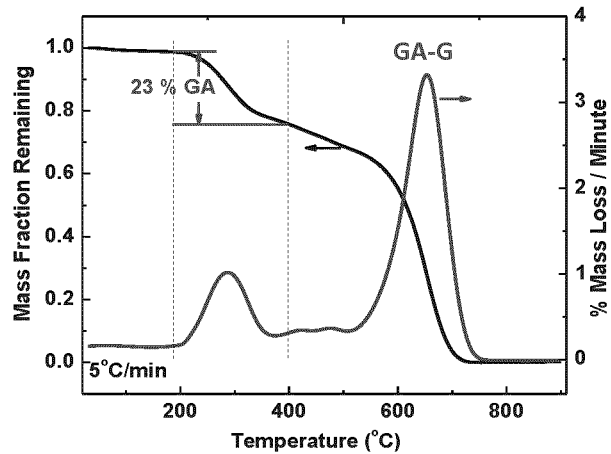
FIGS. 3a and 3b illustrate the thermo-gravimetric analysis (TGA) of (a) un-cleaned GA-G powder, and (b) cleaned pure-G powder using temperature ramp of 5° C./min.
Figure 3B:
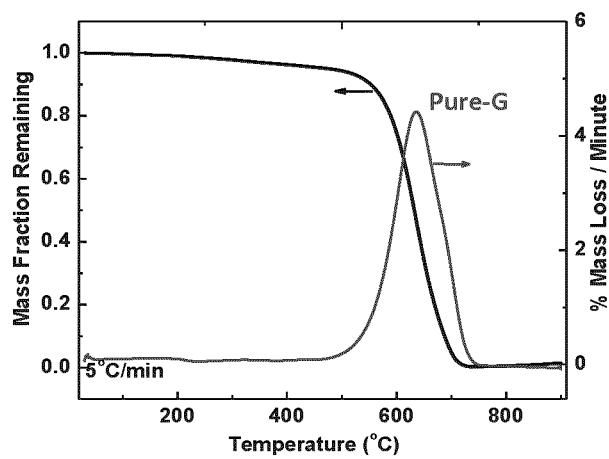

For most applications, pure graphene is highly desired. Therefore, removal of the residual biopolymer-GA is crucial since the residential GA will hamper the properties of graphene. TGA is used as a tool to detect the amount of GA left in graphene and the purity of the graphene. FIG. 3 is the TGA/DTG curves of the un-cleaned GA-G and Pure-G. As illustrated in FIG. 3(a), there are two significant burning stages separated by a transition region which enable us to place an accurate estimate on the graphitic concentration. The 4% mass loss below 100° C. is recognized as the loss of adsorbed moisture. The low temperature burn off happened between 200-400° C. is believed to be GA degradation[27]. The residual GA burns away slowly as temperature increases to 550° C. and then graphitic carbon burns off at higher temperatures accounting for the second burn stage. TGA then suggests approximately 70% of the powder is graphene material. FIG. 3(b) displays the burning off curve of the Pure-G. Without GA, the DTG only shows the graphitic carbon burning peak. Thus, the data suggests that the GA removal steps are successful to get rid of the leftover GA in the materials.

Figure 4A:
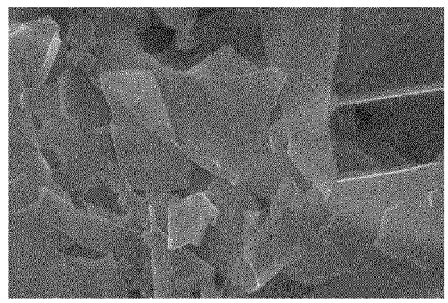
FIGS. 4a and 4b illustrate scanning electron micrographs (SEMs) of (a) pure-G and (b) F-G graphene show totally different morphology. Pure-G reserves graphite rigid platelet structure while F-G looks more like soft fabric.
Figure 4B:
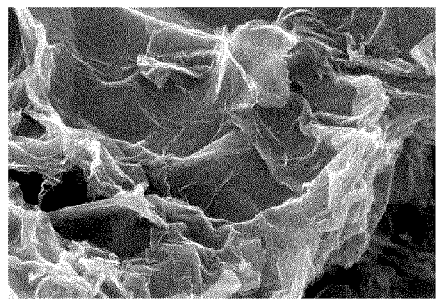

It is important to investigate the morphology and size of our exfoliated carbon product. SEM of the Pure-G powder in FIG. 4(a) illustrates the extent of exfoliation from the original large 2-15 μm size graphite particles, with approximately 1-2 μm thickness. The thin rigid flakes from Pure-G appear to vary widely in size anywhere from a few hundred nanometers in their longest dimension to around 2 μm. The flakes are thin enough that they appear transparent in the SEM but the corners remain sharp and the edges are very well defined. The bright field created by sheets perpendicular to the imaging plane show us that the layers are on the order of only a few nanometers. This morphology is more close to the graphene produced through intercalation and thermal shock[38,39]. The flake surface appears to be mostly free of defects based on the very smooth surface texture observed. This is in contrast to the F-G in FIG. 4(b), which displays highly wrinkled morphology with a high degree of bending out of plane. The high level of curvature makes it difficult to discern the boundaries between sheets and the ribbon-like edges are full of folds and a high degree of curvature. Thus, graphene produced through our current procedure better preserves the characteristics of graphite, the properties will be more close to real graphene produced by physical scotch tape peeling[40].

Figure 4C:
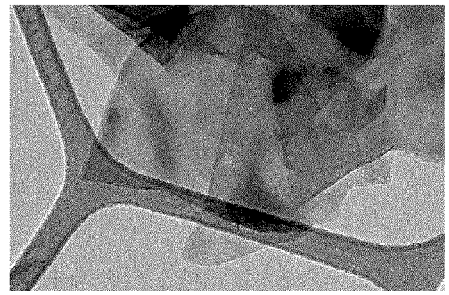
FIGS. 4c-4f illustrate wide field and high resolution transmission electron microscopy (TEM) images of pure-G (c, d) and F-G (e, f).
Figure 4D:
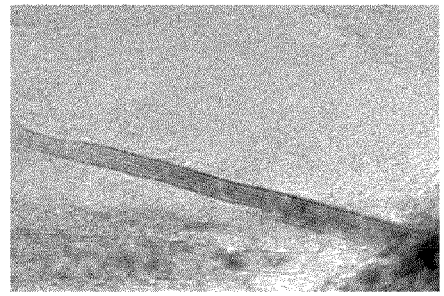
Figure 4E:
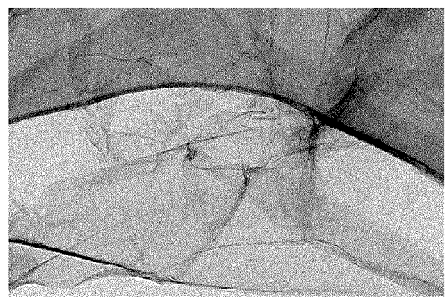
Figure 4F:
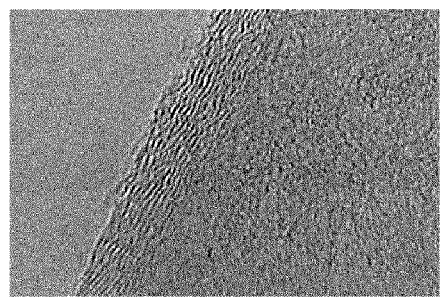

To further investigate the size and dimension of the Pure-G flakes we consider the TEM images in FIGS. 4(c) and (d). The wide-field image in FIG. 4(c) reveals some flake aggregation and clustering. The small rigid flakes are stacked flat but twisted in random orientations providing a clear distinction between flakes similar to SEM. TEM close-up of the flake edges reveals the well-defined layer structure of the multi-layer graphene and FIG. 4(d) is representative of many TEM images taken which reveal graphene flakes containing approximately 6-8 layers. The F-G wide field image again reveals the wrinkled sheets, probably caused by the large number of basal plane defects inherent to the use of GO as a precursor. In comparison to the Pure-G we can see that the sheets appear larger and less clustered. The high resolution TEM images depict the thin ribbon-like morphology of the F-G also contains 6-8 layers, equating to a thickness of around 2-3 nm. TEM observation is in agreement that Pure-G preserves more graphite characteristic than the reduced GO (F-G).

Figure 5A:
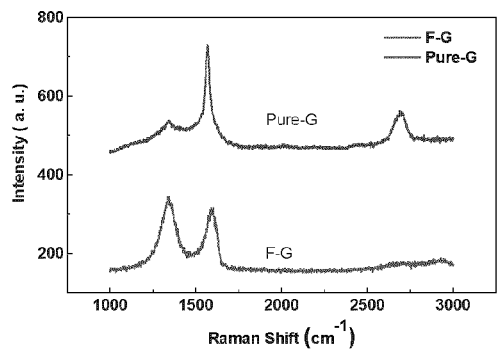
FIG. 5a illustrates a comparison of Raman spectra between pure-G and F-G to determine defect concentration.
Figure 5B:
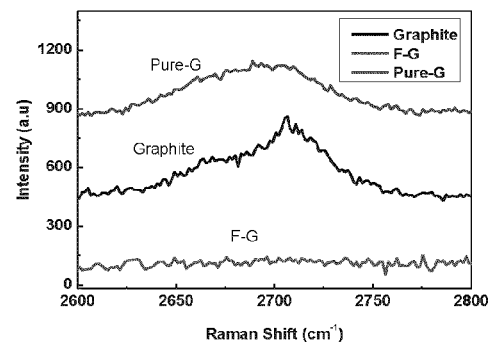
FIG. 5b illustrates a subsection of Raman spectra with additional graphite comparison of 2D peak variation.

Raman spectra, FIG. 5, act as a tool for determining relative defect concentrations. In graphite the D-band ($I_d$, 1350 cm$^{-1}$) is negligible compared to the high G-band ($I_g$, 1580 cm$^{-1}$) and moderately intense 2D band at higher wave numbers. The D-band represents disorder in the graphitic structure, enabling defect content analysis by comparing the intensity of the two characteristic bands. Chemically reduced graphene, such as F-G, is known to exhibit high concentrations of both basal and edge defects due to the harsh oxidation process. In FIG. 5(a), F-G depicts a large $I_d/I_g$ defect ratio (~1.31), and Pure-G illustrates a much smaller shift in the defect ratio (~0.25). This low increase in the D-band indicates the mild exfoliation process which leads to very few basal plane defects and only moderate levels of edge defects. Lotya et al observed a higher defect ratio of 0.57 after sonication and confirmed the logic that the defect ratio increases for smaller flake sizes[22]. The low number of edge defects for the Pure-G flakes suggests the highly unaltered graphitic character of the basal plane and the effectiveness of the biopolymer in preventing further scission of the small flakes. In FIG. 5(b) the 2D peak present in graphite is completely lost for F-G, while Pure-G exhibits a small shift in the peak position and shape. The lack of 2D peak of F-G suggests the reduction level is low, not completely restoring the graphitic ring structure. Based on the use of a 633 nm laser in the Raman analysis, the 2D peak shift, broadening and loss of the ~2670 cm$^{-1}$ peak shoulder can also act as a rough measure of the graphene layer thickness. According to the literature, the 20-30 cm$^{-1}$ Raman shift from the graphite peak in FIG. 5(b) suggests a wide distribution of thicknesses between 5 and 20 layers[1]. This is in general agreement with the estimated thickness distribution suggested by TEM imaging. The low defect concentration exhibited by Raman suggests that the adsorbed GA will protect the flake surface and particle size will stabilize after sufficient sonication time.

TABLE 2

Summary of Raman Characterization of the D, G and 2D bands of Pure-G and F-G, compared to literature work.

| Material | $I_D/I_G$, Defect Ratio | 2D Peak Analysis (cm$^{-1}$) | Additional Sources |
|---|---|---|---|
| Pure-G | 0.25 | Broad, Centered at 2680 | |
| F-G | 1.31 | No Peak | |
| Surfactant Exfoliated | 0.3-1.4 | — | 17, 21, 22, 41-43 |
| Graphite | 0-0.2 | Sharp, Centered at 2700-2710 Shoulder extends to 2650-2660 | 17 |
| Single Layer Graphene | — | Sharp, Centered at 2650 | 44 |
| 5-10 layer Graphene | — | Broad, Centered at 2650-2690 | 44 |

Figure 6A:
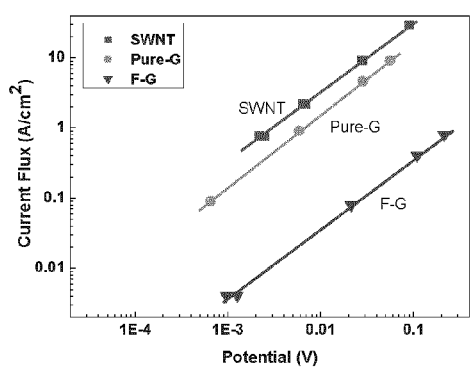
FIG. 6a illustrates 4-probe electrical conductivity results for pure-G, F-G, and SWNT film, respectively.
Figure 6B:
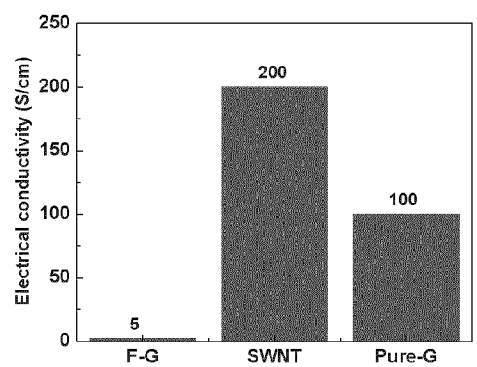
FIG. 6b illustrates average calculated electrical conductivity values for the range tested.

Electrical conductivity testing of the carbon pellets and films revealed in FIG. 6(a) a linear relationship which held for a wide range of test potentials. The slope of FIG. 6(a) was used in junction with the measured width and thickness values for each pellet/film to determine the average conductivity shown in FIG. 6(b). High average conductivity of 200 S/cm is also seen for the 1-dimensional single-walled carbon nanotubes (SWNTs) film. This is close to the literature published result[45]. The low defect concentration in the graphitic structure of the Pure-G pellet enabled us to achieve around 100 S/cm. Comparable to the 15-72 S/cm achieved by other liquid-phase dispersion techniques demonstrated by previously[16,18,22]. The experimentally measured conductivities of the graphene film is significantly lower than the conductivity of a single graphene sheet, (theoretical in-plane conductivity ~$10^6$ S/cm[46]), which suggests that the resistance of the film is dominated by the resistance of the inter-particle junctions[45]. Reduced graphene materials have been shown to exhibit relatively low conductivity along their basal plane. The conductivity of the current F-G film was only 5 S/cm due to a low degree of reduction. A survey of different reduced GO sheet measurements suggests a wide range of conductivities from 0.05-298 S/cm depending on the technique used and degree of reduction[1,47,48]. Thus the results show that the graphene film produced by the current process has 20 times higher electrical conductivity than that of the reduced GO film.

Discussion

The low power sonication technique places stress on the graphite particles by strong sonophysical energy. This stress is transferred throughout the sp$^2$ hybridized carbons in the graphene planes, weakening the attraction between the layers created by the Van der Waals forces that hold the graphene sheets together. The 10 nm hydrodynamic radius of GA suggests the polymers are too large to intercalate and overcome the 0.35 nm spacing of the graphite planes. However, the dark black color of the graphene powder, Raman peak shift, and high resolution TEM results strongly support the exfoliation of initial graphite into multi-layer graphene flakes.

We expect the GA likely adsorbs to the exposed surfaces of the graphite, creating a barrier to aggregation and allowing the graphite to slowly exfoliate in the form of undamaged flakes. We believe that GA functions similar to the way surfactant does, but without the formation of micelles. GA works as a shelter to prevent the aggregation of the produced graphene. Despite being comparably thin to the F-G materials, the Pure-G exhibits rigid morphology. This rigidity indicates a comparably low number of basal plane defects. Further, the lower overall defect ratios for the Pure-G are much lower than for F-G. This is supported by the data from SEM, TEM and Raman spectra. Over time, the sonication stress can also induce scission along the basal plane, reducing the size of the particles, accounting for the possible small edge defects and allowing further graphite exfoliation.

We have therefore demonstrated that with the assistance of the environmental friendly biopolymer, Gum Arabic, we are able to produce 5-10 layer graphene through mild sonication. The dispersed GA-G, at high concentration of 0.5 mg/mL, produced by this methodology retains a non-negligible quantity of dispersing agent. As made evident by TGA and the UV spectra in order to obtain Pure-G secondary washing steps or other GA removal steps are required. Once purified, the electrical conductivity of the compact graphene films was almost 20 times higher than our reduced graphene oxide material. The characterizations also show that this material preserves the graphite rigid structure, having much less defect compared to reduced graphene oxide. The process is simple, environmental friendly, scalable, and with 5 wt. % high yield, leading to the possibility for mass production of graphene.

Although the invention has been described with reference to certain specific embodiments, various modifications thereof will be apparent to those skilled in the art. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The scope of the claims appended hereto should not be limited by the preferred embodiments set forth in the above description, but should be given the broadest interpretation consistent with the present specification as a whole. The disclosures of all prior art recited herein are incorporated herein by reference in their entirety.

REFERENCES

1. Singh, V. et al. Graphene based materials: Past, present and future. *Progress in Materials Science* 56, 1178-1271 (2011).
2. Rao, C. N. R., Sood, a K., Subrahmanyam, K. S. & Govindaraj, A. Graphene: the new two-dimensional nanomaterial. *Angewandte Chemie (International ed. in English)* 48, 7752-77 (2009).
3. Deheer, W. et al. Epitaxial graphene. *Solid State Communications* 143, 92-100 (2007).
4. Yan, Z. et al. Growth of bilayer graphene on insulating substrates. *ACS nano* 5, 8187-92 (2011).
5. Chen, C. et al. Self-Assembled Free-Standing Graphite Oxide Membrane. *Advanced Materials* 21, 3007-3011 (2009).
6. Geng, D. et al. Nitrogen doping effects on the structure of graphene. *Applied Surface Science* 257, 9193-9198 (2011).
7. Zhou, X. & Liu, Z. A scalable, solution-phase processing route to graphene oxide and graphene ultralarge sheets. *Chemical communications* (Cambridge, England) 46, 2611-3 (2010).
8. Ali, F., Agarwal, N., Nayak, P. K., Das, R. & Periasamy, N. Chemical route to the formation of graphene. *Current* 97, 683-685 (2009).
9. Park, S. & Ruoff, R. S. Chemical methods for the production of graphenes. *Nature nanotechnology* 4, 217-24 (2009).

10. Tung, V. C., Allen, M. J., Yang, Y. & Kaner, R. B. High-throughput solution processing of large-scale graphene. *Nature Nanotechnology* 4, 25-29 (2009).
11. Becerril, H. a et al. Evaluation of solution-processed reduced graphene oxide films as transparent conductors. *ACS nano* 2, 463-70 (2008).
12. Shin, H.-J. et al. Efficient Reduction of Graphite Oxide by Sodium Borohydride and Its Effect on Electrical Conductance. *Advanced Functional Materials* 19, 1987-1992 (2009).
13. Stankovich, S. et al. Synthesis of graphene-based nanosheets via chemical reduction of exfoliated graphite oxide. *Carbon* 45, 1558-1565 (2007).
14. Eda, G., Fanchini, G. & Chhowalla, M. Large-area ultrathin films of reduced graphene oxide as a transparent and flexible electronic material. *Nature nanotechnology* 3, 270-4 (2008).
15. Environment Canada and Health Canada Screening Assessment for the Challenge—Hydrazine CAS RN 302-1-2. *Environment Canada* (2011).
16. Hamilton, C. E., Lomeda, J. R., Sun, Z., Tour, J. M. & Barron, A. R. High-yield organic dispersions of unfunctionalized graphene. *Nano letters* 9, 3460-2 (2009).
17. Khan, U., O'Neill, A., Lotya, M., De, S. & Coleman, J. N. High-concentration solvent exfoliation of graphene. *Small* (Weinheim an der Bergstrasse, Germany) 6, 864-71 (2010).
18. Hernandez, Y. et al. High-yield production of graphene by liquid-phase exfoliation of graphite. *Nature nanotechnology* 3, 563-8 (2008).
19. Bourlinos, A. B., Georgakilas, V., Zboril, R., Steriotis, T. a & Stubos, A. K. Liquid-phase exfoliation of graphite towards solubilized graphenes. *Small* (Weinheim an der Bergstrasse, Germany) 5, 1841-5 (2009).
20. Vadukumpully, S., Paul, J. & Valiyaveettil, S. Cationic surfactant mediated exfoliation of graphite into graphene flakes. *Carbon* 47, 3288-3294 (2009).
21. Lotya, M. et al. Liquid phase production of graphene by exfoliation of graphite in surfactant/water solutions. *Journal of the American Chemical Society* 131, 3611-20 (2009).
22. Lotya, M., King, P. J., Khan, U., De, S. & Coleman, J. N. High-concentration, surfactant-stabilized graphene dispersions. *ACS nano* 4, 3155-62 (2010).
23. Cserháti, T., Forgács, E. & Oros, G. Biological activity and environmental impact of anionic surfactants. *Environment international* 28, 337-48 (2002).
24. Zoller, U. Water Reuse/Recycling and Reclamation in Semiarid Zones: The Israeli Case of Salination and "Hard" Surfactants Pollution of Aquifers 1. *Journal of Environmental Engineering* 683-688 (2006).
25. Marta, C. L. S. Behavior Of Anionic And Nonionic Surfactants And Their Persistent Metabolites In The Venice Lagoon, Italy. *Environmental Toxicology* 19, 2000-2007 (2007).
26. Swenson, H. A., Kaustinen, H. M. & Ola, A. Structure of Gum Arabic and Its Configuration in Solution Isolation of Gum Arabic. *Journal of Polymer Science* 6, 1593-1606 (1968).
27. Cozic, C., Picton, L., Garda, M.-R., Marlhoux, F. & Le Cerf, D. Analysis of arabic gum: Study of degradation and water desorption processes. *Food Hydrocolloids* 23, 1930-1934 (2009).
28. Bandyopadhyaya, R., Nativ-roth, E., Regev, O., Yerushalmi-rozen, R. & Sheva, B. Stabilization of Individual Carbon Nanotubes in Aqueous Solutions. *Nano* 15-18 (2002).
29. Dror, Y., Cohen, Y. & Yerushalmi-rozen, R. Structure of Gum Arabic in Aqueous Solution. *Polymer* 5, 3265-3271 (2006).
30. Erni, P. et al. Interfacial rheology of surface-active biopolymers: *Acacia senegal* gum versus hydrophobically modified starch. *Biomacromolecules* 8, 3458-66 (2007).
31. Tauc, J., Grigorovici, R. & Vancu, A. Optical Properties and Electronic Structure of Amorphous Germanium. *physica status solidi (b)* 15, 627-637 (1966).
32. Tauc, J. Electronic Properties of Amorphous Materials. *Science* 158, 1543-1548 (1967).
33. Ci, L. et al. Atomic layers of hybridized boron nitride and graphene domains. *Nature materials* 9, 430-5 (2010).
34. Mathkar, A. et al. Controlled, Stepwise Reduction and Band Gap Manipulation of Graphene Oxide. *The Journal of Physical Chemistry Letters* 3, 986-991 (2012).
35. Wei, J. et al. Preparation of highly oxidized nitrogen-doped carbon nanotubes. *Nanotechnology* 23, 155601 (2012).
36. Zhao, B. et al. Extinction Coefficients and Purity of Single-Walled Carbon Nanotubes. *Journal of Nanoscience and Nanotechnology* 4, 995-1004 (2004).
37. Zhao, B. et al. Study of the Extinction Coefficients of Single-Walled Carbon Nanotubes and Related Carbon Materials. *The Journal of Physical Chemistry B* 108, 8136-8141 (2004).
38. Yu, A. et al. Enhanced Thermal Conductivity in a Hybrid Graphite Nanoplatelet—Carbon Nanotube Filler for Epoxy Composites. *Advanced Materials* 20, 4740-4744 (2008).
39. Yu, a., Ramesh, P., Itkis, M. E., Bekyarova, E. & Haddon, R. C. Graphite Nanoplatelet-Epoxy Composite Thermal Interface Materials. *Journal of Physical Chemistry C* 111, 7565-7569 (2007).
40. Allen, M. J., Tung, V. C. & Kaner, R. B. Honeycomb carbon: a review of graphene. *Chemical reviews* 110, 132-45 (2010).
41. Smith, R. J., King, P. J., Wirtz, C., Duesberg, G. S. & Coleman, J. N. Lateral size selection of surfactant-stabilised graphene flakes using size exclusion chromatography. *Chemical Physics Letters* 531, 169-172 (2012).
42. Seo, J., Green, A., Antaris, A. & Hersam, M. High-Concentration Aqueous Dispersions of Graphene Using Nonionic Biocompatible Block Copolymers. *J. Phys. Chem. Lett.* 2, 1004-1008 (2011).
43. Green, A. a & Hersam, M. C. Solution phase production of graphene with controlled thickness via density differentiation. *Nano letters* 9, 4031-6 (2009).
44. Ferrari, A. C. et al. Raman Spectrum of Graphene and Graphene Layers. *Physical Review Letters* 97, 187401 (2006).
45. Bekyarova, E. et al. Electronic properties of single-walled carbon nanotube networks. *Journal of the American Chemical Society* 127, 5990-5 (2005).
46. Chen, J.-H., Jang, C., Xiao, S., Ishigami, M. & Fuhrer, M. S. Intrinsic and extrinsic performance limits of graphene devices on $SiO_2$. *Nature nanotechnology* 3, 206-9 (2008).
47. Zhao, X. et al. Low-cost preparation of a conductive and catalytic graphene film from chemical reduction with $AlI_3$. *Carbon* 50, 3497-3502 (2012).
48. Li, D., Muller, M. B., Gilje, S., Kaner, R. B. & Wallace, G. G. Processable aqueous dispersions of graphene nanosheets. *Nat Nano* 3, 101-105 (2008).
49. Hummers, W. Preparation of Graphitic Oxide. *Journal of the American Chemical Society* 80, 1339 (1958).

50. Davies, A. et al. Graphene-Based Flexible Supercapacitors: Pulse-Electropolymerization of Polypyrrole on Free-Standing Graphene Films. *The Journal of Physical Chemistry C* 115, 17612-17620 (2011).
51. Yu, A., Roes, I., Davies, A. & Chen, Z. Ultrathin, transparent, and flexible graphene films for supercapacitor application. *Applied Physics Letters* 96, 253105 (2010).
52. Yu, A., Sy, A. & Davies, A. Graphene nanoplatelets supported MnO$_2$ nanoparticles for electrochemical supercapacitor. *Synthetic Metals* 161, 2049-2054 (2011).

We claim:

1. A method for producing graphene, the method comprising:
   a) contacting graphite with a polymer solution to exfoliate graphene from the graphite by forming a graphene-polymer composite;
   b) separating graphite from the solution containing the graphene-polymer composite;
   c) treating the solution containing the graphene-polymer composite to disassociate graphene from the polymer; and,
   d) isolating graphene from the solution.

2. The method of claim 1, wherein the polymer solution of step (a) comprises a polymer and a solvent.

3. The method of claim 1, wherein the polymer is a biopolymer.

4. The method of claim 3, wherein the polymer is a polysaccharide, a polypeptide or a combination thereof.

5. The method of claim 4, wherein the polymer is Gum Arabic, guar gum, locust bean gum, carrageen gum, xanthan gum or any combination thereof.

6. The method of claim 1, wherein the contacting step (a) comprises sonicating the solution of the graphite and the polymer.

7. The method of claim 6, wherein the sonication is conducted for about 1 to 100 hours.

8. The method of claim 6, wherein the sonication is conducted at a temperature of about 10° to 50° C.

9. The method of claim 1, wherein step (b) comprises centrifuging the solution.

10. The method of claim 1, wherein step (c) comprises hydrolyzing the polymer of the graphene-polymer composite.

11. The method of claim 10, wherein the hydrolysis comprises acid hydrolysis.

12. The method of claim 11, wherein the acid hydrolysis is conducted with nitric acid, sulfuric acid or a combination thereof.

13. The method of claim 12, wherein the hydrolysis is conducted for about 1 to 24 hours.

14. The method of claim 12, wherein the hydrolysis is conducted at a temperature of about 50° to 200° C.

15. The method of claim 1, wherein step (d) comprises centrifugation of the solution after treatment according to step (c).

16. The method of claim 6, wherein step (b) comprises centrifuging the solution.

17. The method of claim 16, wherein step (c) comprises hydrolyzing the polymer of the graphene-polymer composite.

18. The method of claim 17, wherein step (d) comprises centrifugation of the solution after treatment according to step (c).

* * * * *